US006472445B1

(12) United States Patent
Takahashi et al.

(10) Patent No.: US 6,472,445 B1
(45) Date of Patent: Oct. 29, 2002

(54) POLYPROPYLENE BASE POROUS FILM AND PRODUCTION PROCESS FOR THE SAME

(75) Inventors: Yoshinori Takahashi, Shinnanyo (JP); Daisuke Osaki, Shinnanyo (JP)

(73) Assignee: Tokuyama Corporation, Yamaguchi-Ken (JP)

( * ) Notice: Subject to any disclaimer, the term of this patent is extended or adjusted under 35 U.S.C. 154(b) by 125 days.

(21) Appl. No.: 09/746,227

(22) Filed: Dec. 26, 2000

(30) Foreign Application Priority Data

Dec. 27, 1999 (JP) ............................ 11-369932
Aug. 31, 2000 (JP) ........................ 2000-263637

(51) Int. Cl.[7] ............... C08J 9/00; B29C 71/00; B29C 55/00; D02J 1/06
(52) U.S. Cl. .................. 521/92; 521/134; 264/235.8; 264/288.8; 264/290.2; 428/314.2; 428/314.4
(58) Field of Search ............... 521/92, 134; 264/235.8, 264/288.8, 290.2; 428/314.2, 314.4

(56) References Cited

U.S. PATENT DOCUMENTS

| | | | |
|---|---|---|---|
| 5,169,712 A | | 12/1992 | Tapp |
| 5,176,953 A | * | 1/1993 | Jacoby et al. |
| 5,187,005 A | * | 2/1993 | Stahle et al. |
| 5,236,963 A | | 8/1993 | Jacoby et al. |
| 5,310,584 A | * | 5/1994 | Jacoby et al. |
| 5,317,035 A | * | 5/1994 | Jacoby et al. |
| 5,393,603 A | * | 2/1995 | Yoyoda et al. |
| 5,439,628 A | | 8/1995 | Huang |
| 5,445,862 A | * | 8/1995 | Kaneko et al. |
| 5,594,070 A | * | 1/1997 | Jacoby et al. |
| 6,156,421 A | * | 12/2000 | Stopper et al. |

FOREIGN PATENT DOCUMENTS

| | | |
|---|---|---|
| EP | 0227037 | 7/1987 |
| JP | 01048141 | 3/1984 |
| JP | 04335043 | 11/1992 |
| JP | 05248043 | 9/1993 |
| JP | 08231775 | 9/1996 |
| JP | 09277414 | 10/1997 |

* cited by examiner

*Primary Examiner*—Morton Foelak
(74) *Attorney, Agent, or Firm*—Wenderoth, Lind & Ponack, L.L.P.

(57) ABSTRACT

Provided is a porous film which is excellent in a water vapor transmission rate, a tear strength and a weatherability. This porous film can be produced by melt-extruding, for example, by a T-die method, a composition comprising 100 parts by weight of a resin blend (1) comprising 100 parts by weight of ① an ethylene-propylene copolymer, 3 to 40 parts by weight of ② a low density polyethylene and 3 to 40 parts by weight of ③ an ethylene-vinyl acetate copolymer and 100 to 200 parts by weight of calcium carbonate (2), or a composition comprising 100 parts by weight of the above resin blend (1), 100 to 200 parts by weight of calcium carbonate (2), 0.5 to 20 parts by weight of titanium dioxide (3) coated on a surface thereof with silica and/or alumina, 0.2 to 10 parts by weight of a hindered amine light stabilizer (4) having a molecular weight of 1500 to 4500 and 0.03 to 3 parts by weight of an ethyl ester phosphorus acid or biphenylene phosphonites antioxidant (5), receiving the extruded matter at a draft ratio of 2 to 30 and a non-stretched film-forming speed of 20 m/minute or more, cooling it by an air chamber method or an air knife method and then stretching it in a monoaxial or biaxial direction by at least 1.3 time in terms of an area magnification.

18 Claims, No Drawings

POLYPROPYLENE BASE POROUS FILM AND PRODUCTION PROCESS FOR THE SAME

The present invention relates to a porous film used for moisture-permeable and waterproofing sheets for a roof and a wall. Specifically, the present invention relates to a film which is excellent in a heat adhesive property with a nonwoven fabric and which is provided with a weatherability in addition to a moisture permeability and a waterproofing property.

A sheet obtained by sticking a polyolefin base porous film to other reinforcing porous materials has so far been widely used as a waterproofing and moisture-permeable material which is used in a gas-permeable layer method for a wall and a roof. Required to a moisture-permeable film used for such use are not only a strength and a durability in construction in addition to the functions of water-proofing and moisture permeability but also a low production cost.

Accordingly, the above porous film is usually laminated on one face or both faces thereof with a reinforcing porous material such as a nonwoven fabric to elevate a strength and a durability. Sticking with a hot melt adhesive and heat fusion are usually used for the laminating method. In particular, used in many cases from a view-point of a profitability is a method in which fused on the above porous film is a nonwoven fabric comprising a polyethylene (hereinafter referred to as PE) fiber or a polypropylene (hereinafter referred to as PP) fiber, for example, a span bond, which is produced by a heat fusion method. In order to achieve such object, a porous film having a good heat fusibility with a nonwoven fabric has to be obtained, and the film is usually composed of a resin of the same series as a non-woven fabric. PP base resins are usually used in many cases. The PP base resin called here is a general term of a polymer or a polymer mixture comprising 50 wt % or more of a propylene component.

Further, it is investigated to reduce a film thickness of the porous film and expedite a film-forming speed thereof as means for reducing the production cost.

It has so far been tried to use a blend of a PP resin and low density polyethyrene as a resin for a PP base porous film to thereby improve the heat adhesive property (Japanese Patent Publication No. 48141/1989). In this process, however, though the laminate strength is revealed, the film itself is increased in a thickness and can not be thinned.

Further, it is proposed to thermally stick a PP-made reticulate fiber as a reinforcing substance to a film obtained by adding a lubricant to a PP-made resin and an inorganic filler to obtain a composition, extruding the composition and monoaxially stretching the extruded matter at a high magnification (Japanese Patent Application Laid-Open No. 248043/1993). However, the above reinforcing substance has a low melting point and therefore does not necessarily have a sufficiently high heat adhesive property with a PP resin film.

When a nonwoven fabric such as a PP span bond is thermally stuck to a polyolefin base porous film which is monoaxially stretched in a thickness of 20 to 50 μm for the purpose of obtaining a thin film, a suitable tear strength is required to the film, and if the tear strength is weak, the film is torn in laminating in a certain case. Accordingly, it has been considered difficult to use a thin film of, for example, 50 μm or less for the use described above.

Further, also proposed as a method for producing a porous film is a method in which a film discharged from a T-die is received at a draft ratio of 20 to 1000 and then monoaxially stretched (Japanese Patent Application Laid-Open No. 335043/1992). However, when obtaining a thin film having a thickness of, for example, 20 to 50 μm, the more the draft ratio is increased, the more the draw resonance is liable to be caused, and therefore the purpose of forming a film at a high speed has not necessarily been sufficiently achieved.

With respect to a PE base porous film among the polyolefin base porous films blended with inorganic fillers in large quantities, it is proposed to improve the moldability by blending with other resins and adding the third component. However, a technique for producing a PP base porous film having a small film thickness at a high speed has not so far been published at all.

Accordingly, a technique for producing at high speed, a porous film which is a thin film having an even thickness using a PP resin for a matrix and which has a gas permeability and a moisture permeability and is excellent in a weatherability and a tear strength has been desired.

The present inventors have considered that it shall be insufficient for achieving the technique described above only to investigate a production technique therefor and that a technique for solving the following subjects (1) and (2) regarding a resin to be used has to be found:

(1) to find a filler-added resin composition making it possible to evenly discharge a non-stretched film in drawing at a high speed of 20 m/minute or more, preferably 30 m/minute or more and capable of providing a film which does not cause draw resonance and has a thickness reduced to a degree of 20 to 60 μm, preferably 20 to 50 μm by stretching and which is excellent in a tear strength, and (2) to find a resin capable of providing a film which has a thickness reduced to 20 to 60 μm, preferably 20 to 50 μm by stretching at least by 1.3 time in terms of an area magnification, a water vapor transmission rate of 1000 to 3000 g/m$^2$ 24 h and a tear strength of 50 mN (milli-Newton) or more in an orientation direction (stretching direction) and which is excellent in a heat adhesive property with a PP nonwoven fabric.

Intensive investigations made by the present inventors in order to solve the problems described above have resulted in finding that capable of solving the problems described above is a composition prepared by adding calcium carbonate as an inorganic filler to a resin blend comprising a specific ethylene-propylene block copolymer, low density polyethylene and an ethylene-vinyl acetate copolymer in specific proportions.

Thus, provided according to the present invention is a porous film comprising a composition comprising:

(1) 100 parts by weight of a polypropylene base resin blend comprising 100 parts by weight of an ethylene-propylene block copolymer having a maximum peak temperature (Tm) of 140° C. ≦Tm ≦165° C. which is given by differential scanning calorimetry (DSC), 3 to 40 parts by weight of low density polyethylene and 3 to 40 parts by weight of an ethylene-vinyl acetate copolymer and (2) 100 to 200 parts by weight of calcium carbonate, wherein the porous film has a thickness of preferably 20 to 60 μm, a tear strength of 50 mN or more in an aligning direction and a water vapor transmission rate of 1000 to 3000 g/m$^2$ 24 h.

This porous film can be produced by melt-extruding the composition comprising:

(1) 100 parts by weight of the polypropylene base resin blend comprising 100 parts by weight of an ethylene-propylene block copolymer having a maximum peak temperature (Tm) of 140° C. ≦Tm ≦165° C. which is given by differential scanning calorimetry (DSC), 3 to 40 parts by weight of the low density polyethylene and 3 to 40 parts by weight of the ethylene-vinyl acetate copolymer and (2) 100 to 200 parts by weight of calcium carbonate, cooling and then stretching the extruded matter, preferably by melt-extruding it by a T-die method, receiving it at a draft ratio of 2 to 30 and a non-stretched film-forming speed of 20 m/minute or more, cooling it by an air chamber method or an air knife method and then stretching it at least by 1.3 time in terms of an area magnification in a monoaxial or biaxial direction. In the present specification, this porous film and a production process therefor are called the first embodiment of the present invention.

The porous film according to the first embodiment of the present invention not only has a moisture permeability (gas permeability) and a water-proofing property but also has a suitable strength and a good heat adhesive property with a nonwoven fabric and is excellent in a productivity. Accordingly, it is a porous film which is suited to uses for building materials such as house wrapping and roofing. However, materials used for such uses have a possibility that they are left standing in many cases in an outside place where they are exposed directly to sunshine before construction, and this brings about a deterioration in the performances in a certain case. In such case, it is sometimes difficult to sufficiently cope with it by addition of a stabilizer which is usually blended with a resin.

A film which is reduced to a porous one by monoaxially or biaxially stretching a composition comprising a PE base resin, an inorganic filler and an ultraviolet absorber has so far been proposed as a porous film for building materials such as house wrapping which is improved in a weatherability (Japanese Patent Application Laid-Open No. 277414/1997). However, this not only does not necessarily have a weatherability performance required to a gas-permeable film for building materials but also has a problem on a strength.

Thus, the present inventors have intensively investigated to develop a porous film which is excellent in performances for building materials and which has a weatherability, and as a result thereof, they have found that such porous film can be produced from a composition prepared by blending a resin blend comprising a specific ethylene-propylene block copolymer, low density polyethylene and an ethylene-vinyl acetate copolymer in specific proportions with calcium carbonate as an inorganic filler, titanium dioxide coated on a surface thereof with silica and/or alumina as a weatherability-improving agent, a hindered amine compound having a molecular weight of 1500 to 4500 as a light stabilizer and an ethyl ester phosphorous acid or biphenylene phosphonites compound as an antioxidant.

Thus, provided according to the present invention is a porous film comprising a composition comprising:

(1) 100 parts by weight of a PP base resin blend comprising 100 parts by weight of an ethylene-propylene block copolymer having a maximum peak temperature (Tm) of 140° C. ≦Tm≦165° C. which is given by differential scanning calorimetry (DSC), 3 to 40 parts by weight of low density polyethylene and 3 to 40 parts by weight of an ethylene-vinyl acetate copolymer, (2) 100 to 200 parts by weight of calcium carbonate, (3) 0.5 to 20 parts by weight of titanium dioxide coated on a surface thereof with silica and/or alumina, (4) 0.2 to 10 parts by weight of a hindered amine light stabilizer having a molecular weight of 1500 to 4500, and (5) 0.03 to 3 parts by weight of an ethyl ester phosphorous acid or biphenylene phosphonites antioxidant, wherein the porous film has a thickness of preferably 20 to 60 μm, a tear strength of 50 mN or more in an aligning direction and a water vapor transmission rate of 1000 to 3000 g/m² ·24 h.

This porous film can be produced by melt-extruding a composition comprising the components (1) to (5) described above, cooling and then stretching it, preferably by melt-extruding it by a T-die method, receiving it at a draft ratio of 2 to 30 and a non-stretched film-forming speed of 20 m/minute or more, cooling it by an air chamber method or an air knife method and then stretching it at least by 1.3 time in terms of an area magnification in a monoaxial or biaxial direction. In the present specification, this porous film and a production process therefor are called the second embodiment of the present invention.

The largest characteristic of the porous film according to the second embodiment of the present invention resides in the point that it is a porous film which is excellent in a weatherability and does not cause leaking of water at an atmospheric pressure and which has a water vapor transmission rate of 1000 to 3000 g/m² ·24 h and a tear strength of 50 mN or more in an orientation direction and has a fixed thickness. Further, another characteristic resides in the points that a porous film having such a small thickness as 20 to 60 μm, preferably 20 to 50 μm is obtained and that it has a high productivity (a non-stretched film-forming speed of 20 m/minute or more, preferably 30 m/minute or more is obtained), that is, it is excellent in a cost performance.

The component (1) which is used in common in the first and second embodiments of the present invention, that is, the PP base resin blend (1) comprises 100 parts by weight of the ethylene-20 propylene copolymer ① having a maximum peak temperature (Tm) of 140° C. ≦Tm ≦165° C. which is given by differential scanning calorimetry (DSC), 3 to 40 parts by weight of the low density polyethylene ② and 3 to 40 parts by weight of the ethylene-vinyl acetate copolymer ③.

The ethylene-propylene copolymer ① having a maximum peak temperature (Tm) falling in the range described above which is given by DSC described above is essential for obtaining a flexibility and a tear strength of the porous film of the present invention. This polymer contains preferably 2% by weight or more, suitably 4% by weight or more of an ethylene component. Also, it is desirable that 70% by weight or more, preferably 90% by weight or more of a propylene component is present. Further, the ethylene-propylene block copolymer ① may contain 2% by weight or more of α-olefin having 4 to 12 carbon atoms, suitably a 1-butene component as other component. If the value of the maximum peak temperature (Tm) is lower than 140° C., the resulting porous film is reduced in a heat resistance and degraded in a heat adhesive property with a reinforcing porous material. On the other hand, the temperature exceeding 165° C. is not normal.

Further, the ethylene-propylene block copolymer ① may be blended with 30% by weight or less, preferably 10% by weight or less of a polypropylene base polymer other than it, for example, a propylene homopolymer, an ethylene-propylene random copolymer and a propylene-1-butene copolymer. However, if these polypropylene base resins other than the ethylene-propylene block copolymer are increased in excess of 30% by weight, the tear strength is inferior, and lamination with a reinforcing matter gets difficult. Further, the performances of the intended porous film are not satisfied, and therefore it is not preferred.

The low density polyethylene ② is produced by a high pressure polymerization method and has a density of usually 0.91 to 0.93 g/cm$^3$, suitably 0.915 to 0.926 g/cm$^3$. If a blending amount of the low density polyethylene is less than 3 parts by weight, draw resonance is caused, and a non-stretched film can not be molded at a rate of 20 m/minute or more. On the other hand, if it exceeds 40 parts by weight, the sufficiently high water vapor transmission rate is not obtained. Draw resonance is a phenomenon in which a molten resin extruded from a die shows a periodic change in a thickness in a flow direction (MD direction) and causes an acceleration in uneven stretching brought about in cold stretching.

The ethylene-vinyl acetate copolymer ③ has a vinyl acetate content of preferably 15 to 40% by weight (about 5 to 13 mole %), suitably 20 to 30% by weight. If an amount of the ethylene-vinyl acetate copolymer is less than 3 parts by weight, it is likely that vertical stripes are produced and the appearance becomes inferior. On the other hand, if it exceeds 40 parts by weight, the rigidity and the heat resistance tend to be lowered.

The respective resins described above have a melt index (MI) of preferably 1.0 to 15 g/10 minutes. Particularly preferably, the ethylene-propylene block copolymer ① and the low density polyethylene ② have an MI of 4.0 to 10 g/10 minutes, and the ethylene-vinyl acetate copolymer ③ has an MI of 2.0 to 5.0 g/10 minutes. If the MI is less than 1.0, the melt viscosity is high, so that the resin pressure and the resin temperature required for extrusion are elevated, and the productivity such as molding at a high rate is lowered. In addition thereto, the film tends to be lowered in a moisture permeability. On the other hand, if the MI exceeds 15, the moisture permeability is improved, but the resin pressure in molding is hard to be elevated, and a precession in a thickness and a mechanical strength of the film tend to be reduced. The MI is a value determined on the conditions of a load of 2160 g and a temperature of 230° C. based on JIS K 6758 in the case of the ethylene-propylene block copolymer ① and it is a value determined on the conditions of a load of 2160 g and a temperature of 190° C. based on JIS K 6760 in the case of the low density polyethylene ② and the ethylene-vinyl acetate copolymer ③.

The inorganic filler which is used in common as the component (2) in the first and second embodiments of the present invention, that is, calcium carbonate is essential for providing the film, with porosity suited to the present invention, and capable of being used without restrictions is any of heavy calcium carbonate produced by mechanically crushing crystalline lime stone of a calcite type having a high purity and classifying it and precipitated calcium carbonate produced by a wet process according to chemical reaction such as a carbon dioxide reaction method, a calcium chloride-soda method and a lime-soda method. These calcium carbonates preferably have an average particle diameter of 0.1 to 30 μm, particularly 0.8 to 5.0 μm from a viewpoint of a rise in the mechanical properties and a revelation in the moisture permeability.

Calcium carbonate (2) is blended in an amount of 100 to 200 parts by weight, suitably 120 to 150 parts by weight per 100 parts by weight of the PP base resin blend (1). If the blending proportion of calcium carbonate is less than 100 parts by weight, it is difficult to form a communicating hole in the film, and the resulting film is reduced in a moisture permeability. On the other hand, if it is more than 200 parts by weight, the resulting film is increased in a moisture permeability but is reduced in a productivity and a mechanical characteristic.

Further, capable of being substituted for 50% by weight or less of calcium carbonate (2) are a single kind or plural kinds of other inorganic fillers, for example, barium sulfate, gypsum, calcium sulfite, calcium phosphate, magnesium carbonate, silicic acid hydrate, silicic anhydride, soda ash, sodium chloride, talc, clay, various cements, volcanic ash, shirasu, titanium dioxide, iron oxide, carbon black, various metal powders, other inorganic matters and organic metal salts comprising principally inorganic matters.

A weatherability required in the porous film according to the second embodiment of the present invention is judged by irradiating with a UV ray having a wavelength of 300 to 400 nm in a dosage of 44 MJ by means of a sunshine carbon arch lamp according to the provision of JIS A 6111. This UV ray dosage corresponds to a sunshine UV ray dosage of 2 months based on the annual average value. However, a UV ray and heat degradation in a film exposed outside is accelerated in May through September when the ambient temperature is high and the UV dosage is increased, and therefore it is a target in the present invention to stand 88 MJ from a practical point of view taking safety into consideration. This corresponds to outdoor exposure during 4 months on the average. In the weatherability test, the film is evaluated as passing the test if the tensile elongation-holding rate is 40% or more after irradiating with a UV ray.

The largest characteristic in the second embodiment of the present invention is that the PP base resin blend (1) is blended with, in addition to calcium carbonate (2), the three components of titanium dioxide (3) coated on a surface thereof with silica and/or alumina, the hindered amine light stabilizer (4) having a molecular weight of 1500 to 4500 and the ethyl ester phosphorous acid or biphenylene phosphonites antioxidant (5) in the prescribed amounts. If at least one of these components (3), (4) and (5) does not satisfy the prescribed amount, the sufficiently high weatherability is not obtained.

Titanium dioxide (3) coated on a surface thereof with silica and/or alumina which is used as the component (3) in the second embodiment of the present invention is suitably titanium dioxide coated on a surface thereof with silica and/or alumina which is obtained by a chlorine process or a sulfuric acid process and which has a crystalline structure of a rutile type or an anatase type. The amount coated with silica and/or alumina is suitably 2 to 20 parts by weight, preferably 4 to 20 parts by weight per 100 parts by weight of titanium dioxide because of the reasons of a weatherability and a coloring property of the resulting porous sheet. In particular, when using 100 parts by weight of rutile type titanium dioxide coated with 4 to 10 parts by weight of a combined substance of silica and alumina, the highest weatherability-improving effect is obtained. Such surface-coated titanium dioxide is already commercially available from, for example, Tioxide Co., Ltd. and the like.

Titanium dioxide (3) coated on a surface thereof with silica and/or alumina is blended in an amount of 0.5 to 20 parts by weight, suitably 1 to 5 parts by weight per 100 parts by weight of the PP base resin blend (1). If this blending proportion is less than 0.5 part by weight, lost is a synergistic effect of improving a weatherability of the above blend brought about by titanium dioxide (3) coated on a surface thereof with silica and/or alumina. On the other hand, if it is more than 20 parts by weight, the weatherability stands in an equilibrium state, and a reduction in the moisture permeability and the strength are brought about.

The hindered amine light stabilizer which is used as the A component (4) in the second embodiment of the present invention has a molecular weight of 1500 to 4500, suitably 2000 to 4000. If the molecular weight is less than 1500, it is not prevented from bleeding onto the surface of the film, and the long term weatherability is not guaranteed. On the other hand, the molecular weight exceeding 4500 is not practical. Examples of such hindered amine include N,N',N'', N'''-tetrakis-(4,6-bis(butyl-(N-methyl-2,2,6,6-tetramethyl-piperidine -4-yl)amino)-triazine-2-yl)-4,7-diazadcane-1,10-diamine, poly-[{6-(1,1,3,3-tetramethylbutyl)amino-1,3,5-triazine-2,4-diyl}-{(2,2,6,6-tetramethyl-4-piperidyl)imino}-hexamethylene{(2,2,6,6-tetramethyl-piperidyl)imino}, poly [(6-morpholino- 1,3,5-triazine-2,4-diyl{(2,2,6,6-tetramethyl-4-piperidyl)imino}hexamethylene{(2,2,6,6-tetramethyl-4-piperidyl)imino}], a polymer of dimethyl succinate with 4-hydroxy-2,2,6,6-tetramethyl-1-piperidineethanol, a condensation polymer of dibutyl-amine·1,3,5-triazine·N,N'-bis(2,2,6,6-tetramethyl-4-piperidyl-1,6-hexamethylenediamine with N-(2,2,6,6-tetramethyl-4-piperidyl)butylamine, a condensation product of 1,2,3,4-butanetetracarboxylic acid and 1,2,2,6,6-pentamethyl-4-piperidinol with β,β,β',β'-tetramethyl-3,9-(2, 4,8,10-tetraoxaspiro[5,5] undecane)-diethanol, and polymethylpropyl-3-oxy-[4(2,2,6,6-tetramethyl)-piperidinyl]siloxane. They can be used alone or in a mixture of two or more kinds thereof. In particular, combined use of hindered amines of an NH type and an $NCH_3$ type can allow a synergistic effect of improving the weatherability to be expected. In this case, a combined use proportion of both amines is preferably 2/8 to 8/2 in terms of a weight ratio.

The hindered amine light stabilizer (4) having a molecular weight of 1500 to 4500 is blended in an amount of 0.2 to 10 parts by weight, preferably 0.5 to 5 parts by weight per 100 parts by weight of the PP base resin blend (1). It is blended more suitably in an amount of 0.5 to 2 parts by weight. If this blending proportion is less than 0.2 part by weight, the weatherability can not be revealed. On the other hand, if it is more than 10 parts by weight, the weatherability falls in an equilibrium state, and the cost rises up. Also, a hindered amine light stabilizer having a molecular weight of less than 1500 can be substituted for 50% by weight or less of the hindered amine light stabilizer (4).

Examples of the ethyl ester phosphorous acid or biphenylene phosphonites antioxidant which is used as the component (5) in the second embodiment of the present invention include bis[2,4-bis-(1,1-dimethylethyl)-6-methylphenyl]ethyl ester phosphorous acid, tetrakis(2,4-di-tert-butylphenyl)[1,1-biphenyl]-4,4'-diylbisphosphonite and tetrakis(2,4-di-tert-butylphenyl)-4,4'-biphenylene-phosphonite. The ethyl ester phosphorous acid or biphenylene phosphonites antioxidant (5) is blended in an amount of 0.03 to 3 parts by weight, preferably 0.1 to 1 part by weight per 100 parts by weight of the PP base resin blend. If this blending proportion is less than 0.03 part by weight, the processing stability in melt-molding is not sufficiently high, and the weatherability is reduced. On the other hand, if it is more than 3 parts by weight, the processing stability and the weatherability fall in an equilibrium state, and the cost goes up. Also, phosphites antioxidant can be substituted for 50% by weight or less of the ethyl ester phosphorous acid or biphenylene phosphonites antioxidant (5).

The composition comprising the components (1) and (2) according to the first embodiment of the present invention and the composition comprising the components (1) to (5) according to the second embodiment of the present invention can suitably be blended, if necessary, with other thermoplastic resins such as a petroleum resin, a pigment, a stabilizer, a surfactant, a plasticizer, oil and other additives as long as the objects of the present invention are not damaged. Among them, fatty acid metal salts, particularly metal salts of hydroxystearic acid are suitably blended in order to inhibit polymer mucus in a general term which is liable to stick to a lip of a die in extrusion-molding. A hindered phenol base antioxidant is suitably blended in order to improve more a heat resistance of the film. A blending proportion thereof may fall in a level usually used. It falls in a range of, for example, not much more than 0.1 to 10 parts by weight per 100 parts by weight of the resin composition.

Next, a preferred method for producing the porous film of the present invention described above shall be explained.

A mixing method and a pelletizing method for the respective components constituting the composition of the present invention, that is, the components (1) and (2) in the first embodiment, the components (1) to (5) in the second embodiment and the additives blended if necessary shall not specifically be restricted, and publicly known methods can be employed. They are mixed, for example, by means of a Hoenshell mixer, a super mixer or a tumbler and then kneaded and pelletized by a method such as strand cutting, hot cutting and underwater cutting by means of a twin screw extruder of a high kneading type and a tandem type kneading machine.

This pelletized composition is melt-extruded by means of a suitable film-forming means, and an extruded non-stretched film is cooled and then stretched in a monoaxial or biaxial direction, whereby a porous film is formed. A circular die can also be used as the film-forming means, but considering the film-forming speed and a homogeneity of the film, a T-die is preferably used.

In the present invention, from a viewpoint of producing a porous film subjected to molecular orientation having a thickness of 20 to 60 μm, preferably 20 to 50 μm at an industrially advantageous low cost, it is important to mold a non-stretched film at a stable receiving speed of 20 m/minute or more, preferably 30 m/minute or more and particularly preferably 60 m/minute or more without causing defects such as draw resonance and vertical stripes. Accordingly, a receiving speed, a draft ratio and a cooling system of the non-stretched film discharged from the T-die have an important meaning in the present invention. That is, it important to adjust a die lip clearance so that a draft ratio of 2 to 30 and a non-stretched film-molding speed of 20 m/minute or more are obtained and to employ an air chamber method or an air knife method as the cooling and fixing system.

The draft ratio in the present invention is a value obtained by dividing the lip clearance of the T-die with the thickness of the non-stretched film.

If the draft ratio exceeds 30, draw resonance is liable to be caused, so that the speed at which the non-stretched film can be formed is reduced, and the air gap (a distance from the die to the cooling roll) has to be elongated, which results in bringing about the inconvenient phenomenon that the neck-in is increased and the film width is reduced. On the other hand, if the draft ratio is less than 2, the lip clearance of the T-die has to be extremely reduced, so that the resin temperature and the die pressure are elevated, and defects such melt fracture are brought about. If the cooling and fixing system is a nip roll system other than the air chamber method or the air knife method, draw resonance is liable to be caused, so that the film can not be molded at a prescribed speed. The air knife method is particularly preferably used.

A forming speed of the non-stretched film is a technically important factor which is related to a production speed of the porous film finally obtained. In the present invention, the non-stretched film-molding speed has to be 20 m/minute or more, preferably 30 m/minute or more and particularly preferably 60 m/minute or more from the viewpoint of the cost performance. The non-stretched film-forming speed is decided by a composition and a draft ratio of the extruded composition, and the draft ratio which is elevated too much over 30 leads to an induction in the draw resonance, so that the upper limit of the above forming speed is usually up to not much more than 120 m/minute.

The non-stretched film described above is monoaxially or biaxially stretched by means of a roll-stretching machine or a tenterstretching machine, whereby it is turned into a porous film. The drawing ratio is preferably 1.3 time or more, usually 1.3 to 3.0 times in terms of an area magnification. Usually, the film is monoaxially stretched, but it is a matter of course that it may be biaxially stretched, and biaxially stretching is preferred in many cases in order to balance the tear strengths in the longitudinal and lateral directions. If the drawing ratio is less than 1.3 time in terms of an area magnification, the prescribed water vapor transmission rate is not obtained. On the other hand, if it exceeds 3.0 times, the water vapor transmission rate is satisfactory, but the tear strength is reduced. The film is stretched preferably at a stretching temperature which is lower by about 20° C. than a melting point of the low density polyethylene resin. Further, in general, a heat treating step and a surface treating step such as corona discharge are preferably carried out soon after the stretching step.

The PP base porous film of the present invention obtained by the method described above has a maximum pore diameter of usually 0.5 to 2.0 μm, suitably 0.7 to 1.3 μm in a communicating pore and has a hydraulic pressure resistance of 150 KPa or more, suitably 250 KPa or more.

The PP base porous film of the present invention is made evenly porous and excellent in a water vapor transmission rate, a tear strength and a weatherability, and the high melting point of the PP base resin makes it easy to thermally stick to a PP span bond. In addition thereto, according to the present invention, the porous film which is as thin as 20 to 60 μm can stably be produced though the non-stretched film is received at a high molding speed of 20 m/minute or more. Further, according to the present invention, the stretched and oriented film is finally received at a speed of 60 m/minute or more, whereby the porous film can be obtained as well.

Accordingly, the porous film of the present invention is not only particularly useful for uses including building materials such as house wrapping and roofing and industrial materials but also suit- ably used as a porous film for sanitary or medical uses.

Examples and comparative examples shall be shown below, but the present invention shall not be restricted to these examples. Physical property values described in the examples and the comparative examples were measured by methods shown below.

1) Thickness:
Determined by means of a dial gauge according to a JIS K 6734 method.
2) Tear Strength:
Determined according to a JIS K 6772 method.
3) Water Vapor Transmission Rate:
Determined according to a DIN 52615 method. It was measured under conditions of a temperature of 23° C. and a humidity of 85%.
4) Weatherability:
A sunshine weather meter (model name: S80, manufactured by Suga Tester Co., Ltd., irradiance: 255 W/m$^2$<300 to 700 nm >) was used as a weatherability-accelerating apparatus. A weatherability-accelerating test was carried out under a condition of a black panel temperature of 63° C. so that the whole irradiation intensity in a UV ray part (300 to 400 nm) became 100 MJ/m$^2$. A tensile elongation of the test piece (type 2) in an MD direction was measured at a drawing speed of 200 mm/minute before and after the weatherability-accelerating test according to JIS K 7127 to calculate the tensile elongation-holding rate according to the following equation:

tensile elongation-holding rate=[tensile elongation after weatherability-accelerating test (100 MJ/m$^2$ irradiated)]/[tensile elongation before weatherability-accelerating test]×100(%)

If the tensile elongation-holding rate is 40% or more, the test piece is evaluated as holding a weatherability which can sufficiently stand outdoor exposure for 4 months.
5) Maximum Pore Diameter:
Determined by an ethanol bubble point method according to an ASTM F 316 method.
6) Hydraulic Pressure Resistance:
Determined according to a JIS L 1092B method.
7) Film Appearance:
The presence of vertical stripes in an MD direction was visually judged.

EXAMPLES 1 To 4

Prepared was a resin blend in which 100 parts by weight of an ethylene-propylene block copolymer (brand name: Tokuyama Polypro PN640G, ethylene content=4.1% by weight, MI =6.5 g/10 minutes, manufactured by Tokuyama Corporation) was blended with low density polyethylene (brand name: Mirason 16SPO, MI=4.5 g/10 minutes, manufactured by Mitsui Chemicals, Inc.) and an ethylene-vinyl acetate copolymer (brand name: Evaflex EV460, MI=2.5 g/10 minutes, vinyl acetate content=19% by weight, manufactured by Du Pont-Mitsui Polychemicals Co., Ltd.) in amounts shown in Table-1. Calcium carbonate (brand name: CSK-5, specific surface area=15500 cm2/g, average particle diameter1.4 μm, manufactured by Dowa Calfine Co., Ltd.) was mixed with 100 parts by weight of this resin blend in proportions shown in Table-1 by means of a super mixer, and the mixture was molten at a cylinder temperature of 190° C. by means of a twin screw extruder to obtain a pelletized kneaded matter. This pellet was extruded from a T-die having a lip clearance of 650 μm installed to a tip part of a single screw extruder having a diameter of 65 mm at a die temperature of 200° C. and received on a take-off unit of an air knife-cooling system, and the speed was changed up to a condition on which draw resonance was not caused to obtain a non-stretched film having a thickness of 55 μm. In this case, the draft ratio was 12. Subsequently, the non-stretched film was preheated at 60° C., stretched in a monoaxial direction at a stretching temperature of 95° C. and a drawing ratio of 2.0 times and subjected to heat treatment between annealing rolls of 100° C. and 50° C. to obtain a porous film having a thickness of 35 μm.

The physical properties of the porous films thus obtained are shown in Table-1 together with the molding conditions.

COMPARATIVE EXAMPLES 1 To 2

The same procedure as in Example 1 was repeated to obtain porous films, except that the grade of the ethylene-propylene block copolymer used in Example 1 was changed to an ethylene-propylene random copolymer (brand name: Tokuyama Polypro PN540G, ethylene content=5.5% by weight, MI=7.5 g/10 minutes, manufactured by Tokuyama Corporation) in Comparative Example 1 and changed to a propylene homopolymer (brand name: Tokuyama Polypro PN130G, MI=4 g/10 minutes, manufactured by Tokuyama Corporation) in Comparative Example 2. The physical properties of the porous films thus obtained are shown in Table-2 together with the molding conditions. The tear strength was reduced both in Comparative Examples 1 and 2. Further, the water vapor transmission rate was lowered in Comparative Example 1 in which the ethylene-propylene random copolymer was used.

EXAMPLE 5

The same procedure as in Example 1 was repeated to obtain a porous film, except that changed were the lip clearance to 330 μm and the draft ratio to 6. The physical properties of the porous film thus obtained are shown in Table-1 together with the molding conditions.

EXAMPLE 6

The same procedure as in Example 1 was repeated to obtain a porous film, except that the lip clearance was changed to 420 gm and the thickness of the non-stretched film was changed to 35 μm and that the thickness of the porous film after stretching was changed to 20 μm. The physical properties of the porous film thus obtained are shown in Table-1 together with the molding conditions.

COMPARATIVE EXAMPLE 3

The same procedure as in Example 1 was repeated to obtain a porous film, except that the low density polyethylene and the ethylene-vinyl acetate copolymer used in Example 1 were not blended. The physical properties of the porous film thus obtained are shown in Table-2 together with the molding conditions. In this comparative example, when the non-stretched film-forming speed exceeded 10 m/minute, draw resonance was caused, so that high speed molding became difficult, and vertical stripes were produced on the stretched film.

COMPARATIVE EXAMPLE 4

The same procedure as in Example 1 was repeated to obtain a porous film, except that the cooling system of the take-off unit used in Example 1 was changed to a nip roll. The physical properties of the porous film thus obtained are shown in Table-2 together with the molding conditions. In this comparative example, when the non-stretched film-forming speed exceeded 12 m/minute, draw resonance was caused, so that high speed molding was difficult.

COMPARATIVE EXAMPLE 5

The same procedure as in Example 1 was repeated to obtain a porous film, except that changed were the lip clearance to 2750 μm and the draft ratio to 50. The physical properties of the porous film thus obtained are shown in Table-2 together with the molding conditions. In this comparative example, when the non-stretched film-forming speed exceeded 18 m/minute, draw resonance was caused, so that high speed molding was difficult.

TABLE 1

| | | Example 1 | Example 2 | Example 3 | Example 4 | Example 5 | Example 6 |
|---|---|---|---|---|---|---|---|
| | | Polypropylene Kind | | | | | |
| | | Block PP | Block PP | Block PP | Block PP | Block PP | Block PP |
| | | | | Grade | | | |
| | | PN640G | PN640G | PN640G | PN640G | PN640G | PN640G |
| Resin | Polypropylene (parts by weight) | 100 | 100 | 100 | 100 | 100 | 100 |
| blend | Low density polyethylene (parts by weight) | 15 | 35 | 15 | 15 | 15 | 15 |
| | Ethylene-vinyl acetate copolymer (parts by weight) | 15 | 35 | 15 | 15 | 15 | 15 |
| Calcium carbonate (parts by weight)* | | 140 | 140 | 110 | 190 | 140 | 140 |
| Non-stretched film-cooling system | | Air knife | Air knife | Air knife | Air knife | Air knife | Air knife |
| Lip clearance (μm) | | 650 | 650 | 650 | 650 | 330 | 420 |
| Non-stretched film thickness (μm) | | 55 | 55 | 55 | 55 | 55 | 35 |
| Draft ratio | | 12 | 12 | 12 | 12 | 6 | 12 |
| Maximum speed (m/min) at which the non-stretched film can stably be molded | | 40 | 55 | 40 | 40 | 60 | 33 |
| Drawing ratio | | 2.0 | 2.0 | 2.0 | 2.0 | 2.0 | 2.0 |
| Forming speed (m/min) after stretching | | 80 | 110 | 80 | 80 | 120 | 66 |
| Film thickness (μm) after stretching | | 35 | 35 | 35 | 35 | 35 | 20 |
| Tear strength (mN) | | 95 | 75 | 100 | 100 | 115 | 50 |
| Water vapor transmission rate (g/m$^2$·24 h) | | 1900 | 1400 | 1300 | 2400 | 1400 | 1800 |
| Maximum pore diameter (μm) | | 1.3 | 1.1 | 1.1 | 1.6 | 1.2 | 1.2 |
| Hydraulic pressure resistance (KPa) | | 250 | 270 | 290 | 190 | 240 | 160 |
| Film appearance (presence of vertical stripes) | | None | None | None | None | None | None |

*parts by weight per 100 parts by weight of the resin blend

TABLE 2

| | Comparative Example 1 | Comparative Example 2 | Comparative Example 3 | Comparative Example 4 | Comparative Example 5 |
|---|---|---|---|---|---|
| | Polypropylene Kind | | | | |

|  | Random PP | Homo PP | Block PP Grade | Block PP | Block PP |
|---|---|---|---|---|---|
|  | PN540G | PN130G | PN640G | PN640G | PN640G |
| Resin Polypropylene (parts by weight) | 100 | 100 | 100 | 100 | 100 |
| blend Low density polyethylene (parts by weight) | 15 | 15 | — | 15 | 15 |
| Ethylene-vinyl acetate copolymer (parts by weight) | 15 | 15 | — | 15 | 15 |
| Calcium carbonate (parts by weight)* | 140 | 140 | 140 | 140 | 140 |
| Non-stretched film-cooling system | Air knife | Air knife | Air knife | Nip roll | Air knife |
| Lip clearance ($\mu$m) | 650 | 650 | 650 | 650 | 2750 |
| Non-stretched film thickness ($\mu$m) | 55 | 55 | 55 | 55 | 55 |
| Draft ratio | 12 | 12 | 12 | 12 | 50 |
| Maximum speed (m/min) at which the non-stretched film can stably be molded | 35 | 40 | 10 | 12 | 18 |
| Drawing ratio | 2.0 | 2.0 | 2.0 | 2.0 | 2.0 |
| Forming speed (m/min) after stretching | 70 | 80 | 20 | 24 | 36 |
| Film thickness ($\mu$m) after stretching | 35 | 35 | 35 | 35 | 35 |
| Tear strength (mN) | 35 | 30 | 100 | 90 | 75 |
| Water vapor transmission rate (g/m$^2 \cdot$24 h) | 800 | 1400 | 2300 | 1900 | 2000 |
| Maximum pore diameter ($\mu$m) | 1.3 | 1.1 | 1.5 | 1.1 | 1.6 |
| Hydraulic pressure resistance (KPa) | 250 | 270 | 210 | 260 | 250 |
| Film appearance (presence of vertical stripes) | None | None | Present | None | None |

* parts by weight per 100 parts by weight of the resin blend

EXAMPLES 7 to 12

Prepared was a resin blend in which 100 parts by weight of the ethylene-propylene block copolymer (brand name: PN640G, ethylene content=4.1% by weight, MI=6.5 g/10 minutes, manufactured by Tokuyama Corporation) was blended with the low density polyetylene (brand name: Mirason 16SPO, MI=4.5 g/10 minutes, manufactured by Mitsui Chemicals, Inc.) and the ethylene-vinyl acetate copolymer (brand name: EV460, MI=2.5 g/10 minutes, vinyl acetate content=19% by weight, manufactured by Du Pont-Mitsui Polychemicals Co., Ltd.) in amounts shown in Table-4. Calcium carbonate (brand name: CSK-5, specific surface area=15500 cm$^2$/g, average particle diameter=1.4 $\mu$m, manufactured by Dowa Calfine Co., Ltd.) and titanium dioxide, a hindered amine light stabilizer and an antioxidant each shown in Table-3 were mixed with 100 parts by weight of this resin blend in proportions shown in Table-4 by means of a super mixer, and the mixture was molten at a cylinder temperature of 190° C. by means of a twin screw extruder to obtain a pelletized kneaded matter. This pellet was extruded from a T-die having a lip clearance of 650 $\mu$m installed to a tip part of a single screw extruder having a diameter of 65 mm at a die temperature of 200° C. and received on a take-off unit of an air knife-cooling system, and the speed was changed up to a condition on which draw resonance was not caused to obtain a non-stretched film having a thickness of 55 $\mu$m. In this case, the draft ratio was 12. Subsequently, the non-stretched film was preheated at 60° C., stretched in a monoaxial direction at a stretching temperature of 95° C. and a drawing ratio of 2.0 times and subjected to heat treatment between annealing rolls of 100° C. and 50° C. to obtain a porous film having a thickness of 35 $\mu$m.

The physical properties of the porous films thus obtained are shown in Table-4 together with the molding conditions.

TABLE 3

| Code | Brand name | Kind | Maker | Surface-coated amount | Molecular weight |
|---|---|---|---|---|---|
| Titanium dioxide |  |  |  |  |  |
| A | R-TC30 |  | Tioxide | Al$_2$O$_3$ = 3.5% SiO$_2$ = 1.2% |  |
| B | R-101 |  | DuPont | None |  |
| Hindered amine light stabilizer and ultraviolet absorber for comparison |  |  |  |  |  |
| a | Tinuvin 622LD | Hindered amine light stabilizer | Ciba Specialty Chemicals K.K. |  | 3500 |
| b | Chimassorb 944FD | Hindered amine light stabilizer | Ciba Specialty Chemicals K.K. |  | 2600 |
| c | Sanol LS-770 | Hindered amine light stabilizer | SANKYO COMPANY, LIMITED |  | 480 |
| d | LA31 | Ultraviolet absorber | ASAHI DENKA KOGYO K.K. |  | 660 |
| Antioxidant |  |  |  |  |  |
| (i) | Sandstab P-EPQ | Biphenylene phosphonites | Clariant (Japan) K.K. |  |  |
| (ii) | Irgafos 38 | Ethyl ester phosphorous acid | Ciba Specialty Chemicals K.K. |  |  |
| (iii) | Irgafos 168 | Phosphites | Ciba Specialty Chemicals K.K. |  |  |

COMPARATIVE EXAMPLES 6 to 7

The same procedure as in Example 7 was repeated to obtain porous films, except that the grade of the ethylene-propylene block copolymer used in Example 7 was changed to the ethylene-propylene random copolymer (brand name: PN540G, ethylene content=5.5% by weight, MI=7.5 g/10 minutes, manufactured by Tokuyama Corporation) in Comparative Example 6 and changed to the propylene homopolymer (brand name: PN130G, MI=4 g/10 minutes, manufactured by Tokuyama Corporation) in Comparative Example 7. The physical properties of the porous films thus obtained are shown in Table-5 together with the molding conditions. The tear strength was reduced both in Comparative Examples 6 and 7. Further, the water vapor transmission rate was lowered in Comparative Example 6 in which the ethylene-propylene random copolymer was used.

EXAMPLE 13

The same procedure as in Example 7 was repeated to obtain a porous film, except that changed were the lip clearance to 330 μm and the draft ratio to 6. The physical properties of the porous films thus obtained are shown in Table-4 together with the molding conditions.

EXAMPLE 14

The same procedure as in Example 7 was repeated to obtain a porous film, except that the lip clearance was changed to 420 μm and the thickness of the non-stretched film was changed to 35 μm and that the thickness of the porous film after stretching was changed to 20 μm. The physical properties of the porous films thus obtained are shown in Table-4 together with the molding conditions.

COMPARATIVE EXAMPLES 8 To 9

The same procedure as in Example 7 was repeated to obtain porous films, except that the low density polyethylene or the ethylene-vinyl acetate copolymer used in Example 7 was not blended. The physical properties of the porous films thus obtained are shown in Table-5 together with the molding conditions. In Comparative Example 8 in which the ethylene-vinyl acetate copolymer was not blended, vertical stripes were produced on the stretched film, and in Comparative Example 9 in which the low density polyethylene was not blended, draw resonance was caused when the non-stretched film-forming speed exceeded 10 m/minute, so that high speed molding was difficult.

COMPARATIVE EXAMPLE 10

The same procedure as in Example 7 was repeated to obtain a porous film, except that the cooling system of the take-off unit used in Example 7 was changed to a nip roll. The physical properties of the porous film thus obtained are shown in Table-6 together with the molding conditions. In this comparative example, when the non-stretched film-forming speed exceeded 12 m/minute, draw resonance was caused, so that high speed molding was difficult.

COMPARATIVE EXAMPLE 11

The same procedure as in Example 7 was repeated to obtain a porous film, except that changed were the lip clearance to 2750 μm and the draft ratio to 50. The results of the physical proper- ties of the porous film thus obtained which were determined by the physical property-measuring method described above are shown in Table-5 together with the molding conditions. In this comparative example, when the non-stretched film-forming speed exceeded 16 m/minute, draw resonance was caused, so that high speed molding was difficult.

COMPARATIVE EXAMPLES 12 To 18

The same procedure as in Example 7 was repeated to obtain porous films, except that the kinds of titanium dioxide, the hindered amine light stabilizer or the ultraviolet absorber and the antioxidant were changed or not added. The physical properties of the porous films thus obtained are shown in Table-5 together with the molding conditions. In these comparative examples, only the films having an unsatisfactory weatherability were obtained.

TABLE 4

| | Example | | | | | | | |
|---|---|---|---|---|---|---|---|---|
| | 7 | 8 | 9 | 10 | 11 | 12 | 13 | 14 |
| Polypropylene kind | Block PP | Block PP | Block PP | Block PP | Block PP | Block PP | Block PP | Block PP |
| Polypropylene grade | PN640G | PN640G | PN640G | PN640G | PN640G | PN640G | PN640G | PN640G |
| Resin blend | | | | | | | | |
| Polypropylene (parts by weight) | 100 | 100 | 100 | 100 | 100 | 100 | 100 | 100 |
| Low density polyethylene (parts by weight) | 15 | 35 | 15 | 15 | 15 | 15 | 15 | 15 |
| Ethylene-vinyl acetate copolymer (parts by weight) | 15 | 35 | 15 | 15 | 15 | 15 | 15 | 15 |
| Calcium carbonate (parts by weight)* | 140 | 140 | 110 | 190 | 140 | 140 | 140 | 140 |
| Titanium dioxide (brand name) | A | A | A | A | A | A | A | A |
| Titanium dioxide (parts by weight)* | 8 | 8 | 8 | 8 | 8 | 8 | 8 | 8 |
| Hindered amine light stabilizer or ultraviolet absorber (brand name) | a | a | a | a | b | a | a | a |
| Hindered amine light stabilizer or ultraviolet absorber (parts by weight)* | 2.5 | 2.5 | 2.5 | 2.5 | 2.5 | 2.5 | 2.5 | 2 5 |
| Ethyl ester phosphorous acid or biphenylene phosphonites antioxidant (brand name) | (i) | (i) | (i) | (i) | (i) | (ii) | (i) | (i) |
| Ethyl ester phosphorous acid or biphenylene phosphonites antioxidant (parts by weight)* | 0.5 | 0.5 | 0.5 | 0.5 | 0.5 | 0.5 | 0.5 | 0.5 |
| Non-stretched film-cooling system | Air knife | Air knife | Air knife | Air knife | Air knife | Air knife | Air knife | Air knife |
| Lip clearance (μm) | 650 | 650 | 650 | 650 | 650 | 650 | 330 | 420 |
| Non-stretched film thickness (μm) | 55 | 55 | 55 | 55 | 55 | 55 | 55 | 35 |
| Draft ratio | 12 | 12 | 12 | 12 | 12 | 12 | 6 | 12 |
| Drawing ratio | 2.0 | 2.0 | 2.0 | 2.0 | 2.0 | 2.0 | 2.0 | 2.2 |
| Maximum speed (m/min) at which the non-stretched film can stably be molded | 40 | 55 | 40 | 40 | 40 | 40 | 60 | 33 |

TABLE 4-continued

| | Example | | | | | | | |
|---|---|---|---|---|---|---|---|---|
| | 7 | 8 | 9 | 10 | 11 | 12 | 13 | 14 |
| Forming speed (m/min) after stretching | 80 | 110 | 80 | 80 | 80 | 80 | 120 | 66 |
| Film thickness ($\mu$m) after stretching | 35 | 35 | 35 | 35 | 35 | 35 | 35 | 20 |
| Tear strength (mN) | 95 | 75 | 100 | 100 | 95 | 95 | 115 | 55 |
| Water vapor transmission rate (g/m$^2$ · 24 h) | 1900 | 1400 | 1300 | 2400 | 1900 | 1900 | 1400 | 1800 |
| Maximum pore diameter ($\mu$m) | 1.3 | 1.1 | 1.1 | 1.6 | 1.3 | 1.3 | 1.2 | 1.2 |
| Hydraulic pressure resistance (KPa) | 250 | 270 | 290 | 190 | 250 | 250 | 240 | 160 |
| Tensile elongation-holding rate (%) after irradiation with 100 MJ/m$^2$ for accelerating weatherability | 60 | 65 | 70 | 45 | 50 | 60 | 65 | 45 |
| Film appearance (presence of vertical stripes) | None | None | None | None | None | None | None | None |

*parts by weight per 100 parts by weight of the resin blend

TABLE 5

| | Comparative Example | | | | | | |
|---|---|---|---|---|---|---|---|
| | 6 | 7 | 8 | 9 | 10 | 11 | 12 |
| Polypropylene kind | Random PP | Homo PP | Block PP | Block PP | Block PP | Block PP | Block PP |
| Polypropylene grade | PN540G | PN130G | PN640G | PN640G | PN640G | PN640G | PN640G |
| Resin blend | | | | | | | |
| Polypropylene (parts by weight) | 100 | 100 | 100 | 100 | 100 | 100 | 100 |
| Low density polyethylene (parts by weight) | 15 | 15 | 15 | — | 15 | 15 | 15 |
| Ethylene-vinyl acetate copolymer (parts by weight) | 15 | 15 | — | 15 | 15 | 15 | 15 |
| Calcium carbonate (parts by weight)* | 140 | 140 | 140 | 140 | 140 | 140 | 140 |
| Titanium dioxide (brand name) | A | A | A | A | A | A | A |
| Titanium dioxide (parts by weight)* | 8 | 8 | 8 | 8 | 8 | 8 | 8 |
| Hindered amine light stabilizer or ultraviolet absorber (brand name) | a | a | a | a | a | a | c |
| Hindered amine light stabilizer or ultraviolet absorber (parts by weight)* | 2.5 | 2.5 | 2.5 | 2.5 | 2.5 | 2.5 | 2.5 |
| Ethyl ester phosphorous acid or biphenylene phosphonites antioxidant (brand name) | (i) | (i) | (i) | (i) | (i) | (i) | (i) |
| Ethyl ester phosphorous acid or biphenylene phosphonites antioxidant (parts by weight)* | 0.5 | 0.5 | 0.5 | 0.5 | 0.5 | 0.5 | 0.5 |
| Non-stretched film-cooling system | Air knife | Air knife | Air knife | Air knife | Nip roll | Air knife | Air knife |
| Lip clearance ($\mu$m) | 650 | 650 | 650 | 650 | 650 | 2750 | 650 |
| Non-stretched film thickness ($\mu$m) | 55 | 55 | 55 | 55 | 55 | 55 | 55 |
| Draft ratio | 12 | 12 | 12 | 12 | 12 | 50 | 12 |
| Drawing ratio | 2.0 | 2.0 | 2.0 | 2.0 | 2.0 | 2.0 | 2.0 |
| Maximum speed (m/min) at which the non-stretched film can stably be molded | 35 | 40 | 40 | 10 | 12 | 16 | 35 |
| Forming speed (m/min) after stretching | 70 | 80 | 80 | 20 | 24 | 32 | 70 |
| Film thickness ($\mu$m) after stretching | 35 | 35 | 35 | 35 | 35 | 35 | 35 |
| Tear strength (mN) | 35 | 30 | 95 | 100 | 90 | 75 | 95 |
| Water vapor transmission rate (g/m$^2$ · 24 h) | 800 | 1400 | 1900 | 2300 | 1900 | 2000 | 1900 |
| Maximum pore diameter ($\mu$m) | 1.3 | 1.1 | 1.3 | 1.5 | 1.1 | 1.6 | 1.3 |
| Hydraulic pressure resistance (KPa) | 250 | 270 | 230 | 220 | 260 | 250 | 250 |
| Tensile elongation-holding rate (%) after irradiation with 100 MJ/m$^2$ for accelerating weatherability | 55 | 40 | 50 | 55 | 60 | 55 | 35 |
| Film appearance (presence of vertical stripes) | None | None | Present | None | None | None | None |

| | Comparative Example | | | | | |
|---|---|---|---|---|---|---|
| | 13 | 14 | 15 | 16 | 17 | 18 |
| Polypropylene kind | Block PP | Block PP | Block PP | Block PP | Block PP | Block PP |
| Polypropylene grade | PN640G | PN640G | PN640G | PN640G | PN640G | PN640G |
| Resin blend | | | | | | |
| Polypropylene (parts by weight) | 100 | 100 | 100 | 100 | 100 | 100 |
| Low density polyethylene (parts by weight) | 15 | 15 | 15 | 15 | 15 | 15 |
| Ethylene-vinyl acetate copolymer (parts by weight) | 15 | 15 | 15 | 15 | 15 | 15 |
| Calcium carbonate (parts by weight)* | 140 | 140 | 140 | 140 | 140 | 140 |
| Titanium dioxide (brand name) | A | A | B | — | A | A |
| Titanium dioxide (parts by weight)* | 8 | 8 | 8 | — | 8 | 8 |
| Hindered amine light stabilizer or ultraviolet absorber (brand name) | d | a | a | a | — | a |
| Hindered amine light stabilizer or ultraviolet absorber (parts by weight)* | 2.5 | 2.5 | 2.5 | 2.5 | — | 2.5 |
| Ethyl ester phosphorous acid or biphenylene phosphonites antioxidant (brand name) | (i) | (iii) | (i) | (i) | (i) | — |
| Ethyl ester phosphorous acid or biphenylene phosphonites antioxidant (parts by weight)* | 0.5 | 0.5 | 0.5 | 0.5 | 0.5 | — |
| Non-stretched film-cooling system | Air knife | Air knife | Air knife | Air knife | Air knife | Air knife |
| Lip clearance ($\mu$m) | 650 | 650 | 650 | 650 | 650 | 650 |
| Non-stretched film thickness ($\mu$m) | 55 | 55 | 55 | 55 | 55 | 55 |
| Draft ratio | 12 | 12 | 12 | 12 | 12 | 12 |
| Drawing ratio | 2.0 | 2.0 | 2.0 | 2.0 | 2.0 | 2.0 |
| Maximum speed (m/min) at which the non-stretched film can stably be molded | 40 | 40 | 40 | 40 | 40 | 30 |
| Forming speed (m/min) after stretching | 80 | 80 | 80 | 80 | 80 | 60 |

TABLE 5-continued

| | | | | | | |
|---|---|---|---|---|---|---|
| Film thickness (μm) after stretching | 35 | 35 | 35 | 35 | 35 | 35 |
| Tear strength (mN) | 95 | 95 | 90 | 95 | 90 | 55 |
| Water vapor transmission rate (g/m² · 24 h) | 1900 | 1900 | 1800 | 1800 | 1900 | 1700 |
| Maximum pore diameter (μm) | 1.3 | 1.3 | 1.6 | 1.4 | 1.3 | 1.9 |
| Hydraulic pressure resistance (KPa) | 250 | 250 | 240 | 240 | 250 | 180 |
| Tensile elongation-holding rate (%) after irradiation with 100 MJ/m² for accelerating weatherability | 25 | 30 | 30 | 20 | 5 | 30 |
| Film appearance (presence of vertical stripes) | None | None | None | None | None | None |

*parts by weight per 100 parts by weight of the resin blend

What is claimed is:

1. A porous film comprising a composition comprising:
   (1) 100 parts by weight of a polypropylene base resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer and
   (2) 100 to 200 parts by weight of calcium carbonate.

2. The porous film as described in claim 1 having a thickness 20 to 60 μm.

3. The porous film as described in claim 1 having a tear strength of 50 mN or more in an orientation direction.

4. The porous film as described in claim 1 having a water vapor transmission rate of 1000 to 3000 g/m²·24 h.

5. The porous film as described in claim 1 having a thickness 20 to 60 μm, a tear strength of 50 mN or more in an orientation direction and a water vapor transmission rate of 1000 to 3000 g/m²·24 h.

6. A production process for the porous film as described in any of claims 1 to 5, characterized by melt-extruding a composition comprising:
   (1) 100 parts by weight of a resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer and
   (2) 100 to 200 parts by weight of calcium carbonate, cooling and then stretching the extruded matter.

7. A production process for the porous film as described in claim 6, characterized by melt-extruding by a T-die method, a composition comprising:
   (1) 100 parts by weight of a resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer and
   (2) 100 to 200 parts by weight of calcium carbonate, receiving the extruded matter at a draft ratio of 2 to 30 and a non-stretched film-forming speed of 20 m/minute or more, cooling it by an air chamber method or an air knife method and then stretching it.

8. The production process for the porous film as described in claim 6, wherein the film is stretched in a monoaxial or biaxial direction by at least 1.3 time in terms of an area magnification.

9. A porous film comprising a composition comprising:
   (1) 100 parts by weight of a polypropylene base resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer,
   (2) 100 to 200 parts by weight of calcium carbonate,
   (3) 0.5 to 20 parts by weight of titanium dioxide coated on a surface thereof with silica and/or alumina,
   (4) 0.2 to 10 parts by weight of a hindered amine light stabilizer having a molecular weight of 1500 to 4500 and
   (5) 0.03 to 3 parts by weight of an ethyl ester phosphorous acid or biphenylene phosphorities antioxidant.

10. The porous film as described in claim 9 having a thickness 20 to 60 μm.

11. The porous film as described in claim 9 having a tear strength of 50 mN or more in an orientation direction.

12. The porous film as described in claim 9 having a water vapor transmission rate of 1000 to 3000 g/m²·24 h.

13. The porous film as described in claim 9 having a thickness 20 to 60 μm, a tear strength of 50 mN or more in an orientation direction and a water vapor transmission rate of 1000 to 3000 g/m² ·24 h.

14. A production process for the porous film as described in any of claims 9 to 13, characterized by melt-extruding a composition comprising:
   (1) 100 parts by weight of a polypropylene base resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer,
   (2) 100 to 200 parts by weight of calcium carbonate,
   (3) 0.5 to 20 parts by weight of titanium dioxide coated on a surface thereof with silica and/or alumina,
   (4) 0.2 to 10 parts by weight of a hindered amine light stabilizer having a molecular weight of 1500 to 4500 and
   (5) 0.03 to 3 parts by weight of an ethyl ester phosphorous acid or biphenylene phosphonites antioxidant, cooling and then stretching the extruded matter.

15. A production process for the porous film as described in claim 14, characterized by melt-extruding by a T-die method, a composition comprising:
   (1) 100 parts by weight of a polypropylene base resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer, (2) 100 to 200 parts by weight of calcium carbonate, (3) 0.5 to 20 parts by weight of titanium dioxide coated on a surface thereof with silica and/or alumina, (4) 0.2 to 10 parts by weight of a hindered amine light stabilizer having a molecular weight of 1500 to 4500 and (5) 0.03 to 3 parts by weight of an ethyl ester phosphorous acid or biphenylene phosphonites antioxidant, receiving the extruded matter at a draft ratio of 2 to 30 and a non-stretched film-forming speed of 20 m/minute or more, cooling it by an air chamber method or an air knife method and then stretching it.

16. The production process for the porous film as described in claim 14, wherein the film is stretched in a monoaxial or biaxial direction by at least 1.3 time in terms of an area magnification.

17. The production process for the porous film as described in claim 7, wherein the film is stretched in a monoaxial or biaxial direction by at least 1.3 time in terms of an area magnification.

18. The production process for the porous film as described in claim 15, wherein the film is stretched in a monoaxial or biaxial direction by at least 1.3 time in terms of an area magnification.

* * * * *